Figure 1:
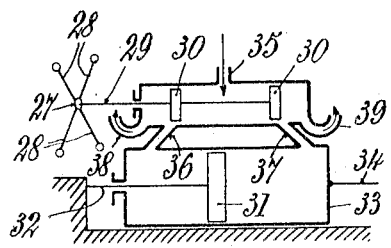

A. F. J. DOUTRE.
AERONAUTICAL MACHINE.
APPLICATION FILED JUNE 19, 1911.

1,084,796.

Patented Jan. 20, 1914.
3 SHEETS—SHEET 1.

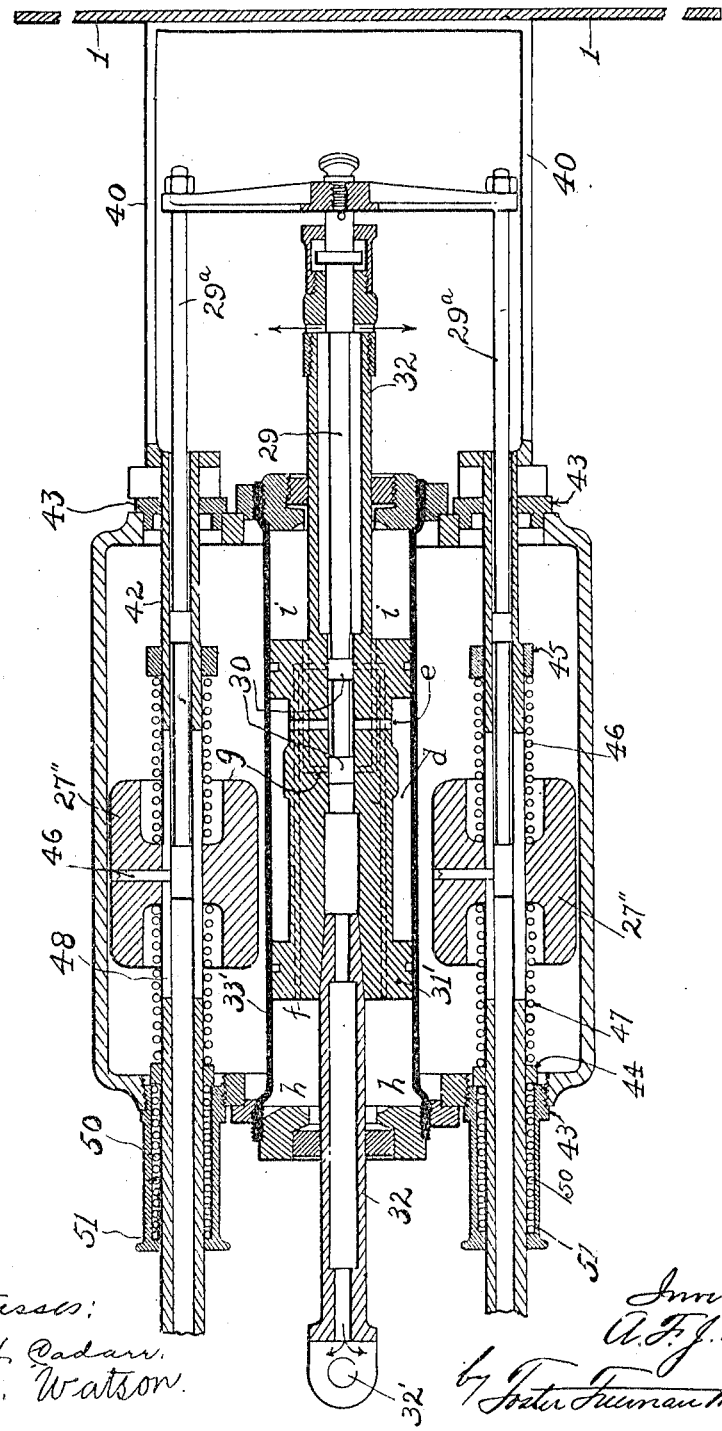

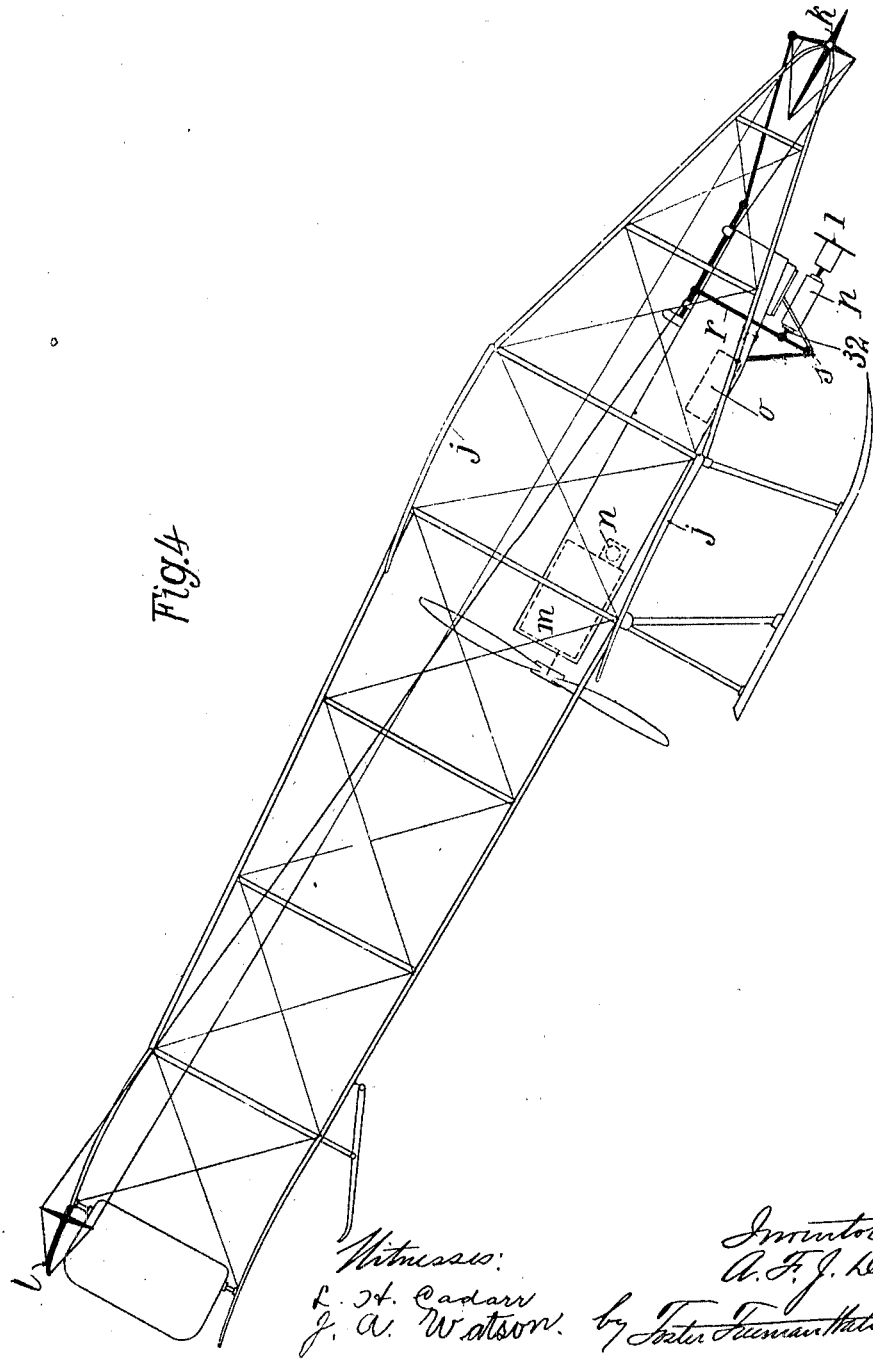

UNITED STATES PATENT OFFICE.

ADOLPHE FRANÇOIS JOSEPH DOUTRE, OF PARIS, FRANCE.

AERONAUTICAL MACHINE.

1,084,796.  Specification of Letters Patent.  Patented Jan. 20, 1914.

Application filed June 19, 1911. Serial No. 633,935.

*To all whom it may concern:*

Be it known that I, ADOLPHE FRANÇOIS JOSEPH DOUTRE, barrister near the Court of Appeal of Indo-China, actually residing at 123 Rue de Faubourg St.-Honoré, Paris, Department of the Seine, France, a citizen of the French Republic, have invented new and useful Improvements in Aeronautical Machines, of which the following is a specification.

The present invention relates to improvements in flying machines and has for its object to provide means for preserving and controlling the longitudinal equilibrium of such machines.

The particular object of the invention is to provide means to automatically preserve and control the longitudinal equilibrium of a flying machine when said equilibrium is disturbed by changes in the velocity of the machine, and particularly by sudden changes in the absolute velocity, which changes may occur simultaneously or not with changes in the relative velocity of the machine.

When the flight of a flying machine is suddenly retarded or accelerated by squalls or other causes, the absolute velocity of the machine, that is the velocity of the machine with relation to the ground, varies and brings the inertia of the apparatus into operation; and if the center of gravity of the machine does not coincide with the center of pressure, the longitudinal equilibrium of the apparatus is disturbed. According to the present invention the longitudinal balance is in such cases automatically maintained by employing the force of inertia developed in the apparatus. To obtain this result the machine is provided with suitable masses or bodies capable of displacement whenever the apparatus is subjected to a sudden variation of absolute velocity, and the displacement of such masses is utilized for operating a balancer.

Any existing part of the machine may be used as the movable mass, such part being suitably mounted, or a special, movable member may also be provided. By these means the automatic operation of the balancer may be effected either directly or indirectly by the movable member.

When the absolute velocity of the machine varies the velocity of the machine with relation to the air varies also, and such latter variation is often the cause of variation of the absolute velocity. As any variation of the relative velocity modifies the longitudinal balance of the machine it is necessary to restore the longitudinal equilibrium when the relative velocity varies, and it is desirable that the apparatus which automatically restores the longitudinal balance, when there is any variation of the absolute velocity, maintain automatically the said balance when there is any variation of the relative velocity of the machine. According to the present invention this result is obtained by means of a combination of parts adapted to be actuated by variations in the absolute velocity of the flying machine with other parts adapted to be actuated by variations in the relative velocity, the said parts controlling a balancing plane.

The means adapted to be actuated by variations in the relative velocity consists preferably of a movable vane normal to the direction of flight and subjected to the action of a spring which acts in opposition to the wind. The means adapted to be actuated by the variations in the absolute velocity comprise a movable body, or bodies, capable of displacement under the action of inertia, and not, or practically not, affected by action of gravitation.

Figure 2:
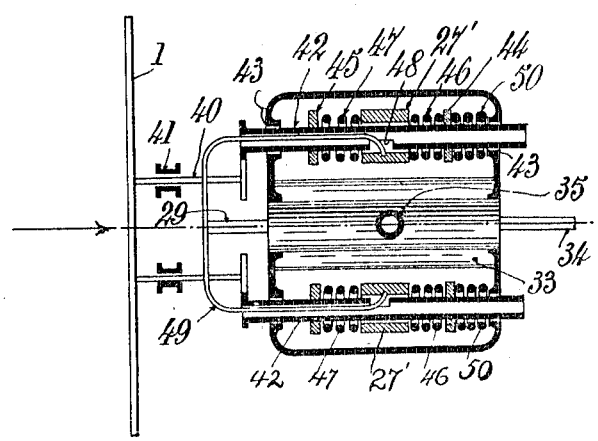

In the accompanying drawings, Figure 1 is a diagrammatic view of a portion of a controlling apparatus embodying the present invention; Fig. 2 is a sectional view illustrating a slightly modified form of the invention; Fig. 3 is a similar view illustrating another modification; Fig. 4 is a view of a flying machine having an embodiment of the invention applied thereto.

Referring to Fig. 1, the movable mass employed for maintaining the longitudinal equilibrium of the machine comprises a weight 27 suitably suspended from the machine by four elastic cords 28. The plane of these four cords is normal to the longitudinal axis of the machine, that is to say, to the direction of flight, so that when any sudden variation in the absolute velocity occurs the mass 27 is projected forward or rearward from the plane of the cords according to the direction of the variation, and is then returned to its original position by the cords. It will be evident that the elastic cords may be replaced by metal springs, the tension of which may be adjusted. The advantage of suspending the movable mass in this manner, in comparison with other forms of suspension and particularly over a pendulating arrangement, is that by it the movable mass is not affected by variations in the inclination of the frame of the machine but only by variations in the absolute velocity.

The mass 27 is connected directly with the rod 29 of the valve 30 of a compressed-air servo-motor comprising a piston 31, rigidly connected at 32 with the frame of the apparatus, and a movable cylinder 33 to which is connected the balancer operating rod 34. An opening 35 in the valve casing is adapted to be connected with a source of compressed air, and two passages 36, 37, connect this casing with the interior of cylinder 33, said casing having also two openings 38 and 39 communicating with the atmosphere. It will be seen that any variation in the position of the mass or body 27 will effect a corresponding displacement of the valve 30 and consequently admit air to one or the other faces of the piston 31. This will produce motion of the cylinder 33, the extent of which will be determined by the amount of movement of the valve. The rod 34 transmits movement of the cylinder 33 to the automatic balancer, not shown in Fig. 1. If desired the cylinder 33 may be stationary and the piston 31 therein movable, or any other form of servo-motor or means of transmitting movement may be employed.

Fig. 2 illustrates a means for automatically actuating the balancer operating rod 34 under variations in the absolute velocity of the machine, as referred to in connection with Fig. 1, and also a means for actuating said rod under variation in the relative velocity. Referring to this figure, 1 indicates a movable plate which is shown to be supported by rods 40 suitably mounted to move freely in guides 41. Connected with each of the said rods is a tube 42 movable in guides 43, and on said tubes are secured rings 44, 45. Springs 46, 47 surround said rods 42, between the rings 44, 45 therein and a movable weight 27', which is adapted to slide longitudinally of the rod. The weight 27' is connected by a rod 49 with the stem 29 of the valve of the auxiliary motor, the tubes 42 having suitable slots 48 through which the ends of the rod 49 extend so that movement of the weights 27' on such rods is not interfered with. Between the rings 44 and the frame of the apparatus are arranged springs 50 which act to push the plate 1 forward whenever the action of the air weakens. With this arrangement it will be seen that the valve rod 29 of the auxiliary motor is controlled both by the action of the plate 1, the position of which will be varied according to the variations in the relative velocity of the machine, and by the variation in the position of the adjustable masses 27', movement of which is caused by variation in the absolute velocity of the machine, and that therefore it is possible to completely regulate the longitudinal equilibrium of the machine with a single mechanism whether the cause interfere with either the absolute or relative velocity.

Referring to Fig. 3, the plate 1 is supported by rods 40 and tubes 42, the latter being adapted to slide in guides 43. As in the form shown in Fig. 2, the rods 42 are provided with collars 44, 45, between which and movable weights 27'' are arranged coiled springs 46, 47, and springs 50 shown as arranged within suitable housings 51 abutting against the collars 44 are provided for holding the plate in its outer position. In this form of the invention the movable weights 27'' are connected by pins extending through slots in the tubes 42 with slide rods 29$^a$ that project beyond the ends of said tubes toward the plate 1 and have such projecting ends connected by a suitable cross-head that is attached to the stem 29 of the valves 30 of the servo-motor. The form of this motor, illustrated in Fig. 3, has the valves 30 arranged within the piston 31', the stem 32 of which is connected, as at 32', with the automatic balancer, the cylinder 33' of such motor being in this instance the stationary member. Compressed air from a suitable source is admitted to a chamber $d$ and through a duct $e$ to the valve chamber, and, according to the adjustment of said valves, passes through ducts $f$, $g$, to chambers $h$, $i$, at opposite ends of the piston 31'.

Referring to Fig. 4, there is illustrated a biplane machine having its center of gravity placed below its center of pressure and provided with two balancers $k$, $l$, at opposite ends, both of which are connected with the automatically acting devices before described. In this figure $j$ represents the planes, $m$ the motor for driving the propeller, $n$ the air compressor, and $o$ a reservoir for the compressed air. The connection shown in this figure between the balancer actuating devices and the movable rod 32 of the auxiliary motor comprises a lever $r$ pivotally supported at $s$ on a portion of the frame of the machine.

It will be understood that whenever the relative speed of the aeroplane diminishes, the position of the plate 1 varies, and the second adjustment of the rod 32 shifts the balancers, and similarly said balancers will be automatically adjusted by variations in the positions of the movable masses 27, 27' or 27'', due to changes in the absolute velocity of the machine.

It will be evident that there can be considerable variation in the construction of some of the parts herein described without departing from the invention. For example, the movable plate 1, which is simply a means sensitive to variations in the relative velocity of the machine, may be replaced by any suitable form of anemometer. In the foregoing description it has been assumed that movements of the balancers will be automatically effected whenever there is any variation in the velocity of the machine, but it will be evident that if desired the parts can be so proportioned that such adjustment of the balancer will only occur when there is a considerable variation in either relative or absolute velocity, that is to say, when such velocity rises above or falls below certain permissible limits.

Having thus described the invention what is claimed and desired to be secured by Letters Patent is:

1. In a flying machine, the combination with a balancing plane, of a mass adapted to move in the direction of the longitudinal axis of the machine when there is any variation in the absolute velocity of the machine, elastic means opposing movement of said mass under the action of gravity, and means controlled by said mass and connected with the balancing plane to properly move the latter to restore the longitudinal equilibrium of the machine when any variation occurs in the absolute velocity thereof.

2. In a flying machine, the combination with a balancing plane, of a mass adapted to move in the direction of the longitudinal axis of the machine when there is any variation of the absolute velocity of the machine, elastic means opposing movement of said mass under the action of gravity, and a servo-motor controlled by said mass and connected with the balancing plane in order to properly adjust the latter in the requisite direction to restore the longitudinal equilibrium of the machine when any variation occurs in the absolute velocity thereof.

3. In a flying machine, the combination with a balancing plane, of a means automatically adjustable by variations in the relative velocity of the machine and air through which it is moving, a body adapted to automatically move longitudinally of the machine when there is a variation of the absolute speed thereof, and connections between both said adjustable members and the balancing plane.

4. In a flying machine, the combination with a balancing plane, of a movable plate connected with the balancing plane and adapted to be moved in one direction by the pressure of air through which the machine is passing, a spring tending to move said plate in the opposite direction, a body capable of moving longitudinally of the machine when the absolute velocity of the latter changes, and means for transmitting movement of said body to the balancing plane.

5. In a flying machine, the combination with a balancing plane, of a movable plate adapted to be moved in one direction by the pressure of air through which the machine passes, a spring acting to move said plate in the opposite direction, a body movable longitudinally of the machine when the absolute velocity thereof changes, and a servo-motor adapted to actuate the plane and controlled by the joint action of said plate and body.

6. In a flying machine, the combination with a balancing plane, of a member adapted to be adjusted by variation in the relative speed of the machine, a body automatically adjustable longitudinally of the machine by variation in the absolute velocity thereof, and a servo-motor having a movable member connected with the balancing plane and a controlling valve adapted to be actuated by both said movable plate and body.

7. In a flying machine, the combination of a balancing plane, a plate supported by a longitudinally movable rod and adapted to be shifted by variation in the pressure of the air through which the machine is traveling, a body mounted on said rod to move longitudinally thereof, collars fixed to said rod on opposite sides of said body, springs interposed between said collars and body, a spring acting to move said plate in opposition to the air pressure thereon, and a servo-motor having a movable member connected with the balancing plane and a controlling valve adapted to be actuated by said movable body.

In testimony whereof I affix my signature in presence of two witnesses.

ADOLPHE FRANÇOIS JOSEPH DOUTRE.

Witnesses:
 CLAUDIUS LUSSON,
 DEAN B. MASON.